US006634176B2

United States Patent
Rouse et al.

(10) Patent No.: US 6,634,176 B2
(45) Date of Patent: Oct. 21, 2003

(54) TURBINE WITH EXHAUST VORTEX DISRUPTER AND ANNULAR RECUPERATOR

(75) Inventors: Gregory C. Rouse, Westlake Village, CA (US); Octavio Solis, Los Angeles, CA (US); David Calta, Newbury Park, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/977,445

(22) Filed: Oct. 15, 2001

(65) Prior Publication Data

US 2003/0131608 A1 Jul. 17, 2003

Related U.S. Application Data

(60) Provisional application No. 60/245,488, filed on Nov. 2, 2000.

(51) Int. Cl.[7] .................................................. F02C 3/14
(52) U.S. Cl. ........................ 60/804; 60/39.511; 60/670

(58) Field of Search ............................. 60/39.511, 645, 60/670, 760, 804, 805

(56) References Cited

U.S. PATENT DOCUMENTS

| 2,946,192 A | * | 7/1960 | Hambling ................ 60/39.511 |
| 3,267,673 A | * | 8/1966 | Hemsworth et al. ..... 60/39.511 |
| 3,898,793 A | * | 8/1975 | Nakamura et al. ......... 60/39.08 |
| 4,474,000 A | * | 10/1984 | Benson et al. ........... 60/39.511 |
| 6,438,936 B1 | * | 8/2002 | Ryan ........................ 60/39.02 |

* cited by examiner

Primary Examiner—Charles G. Freay
Assistant Examiner—John F Belena
(74) Attorney, Agent, or Firm—Pillsbury Winthrop LLP

(57) ABSTRACT

In a turbine engine with an annular recuperator surrounding the turbine, exhaust gas is directed from the turbine to the recuperator by a generally curved exhaust dome. A vortex disrupter structure extends from the exhaust dome to a point distal of the turbine to evenly distribute the exhaust gas entering the recuperator and sustain diffusion of the exhaust gas to increase the expansion ratio across the turbine.

5 Claims, 2 Drawing Sheets

US 6,634,176 B2

TURBINE WITH EXHAUST VORTEX DISRUPTER AND ANNULAR RECUPERATOR

RELATED APPLICATIONS

This application claims the priority of provisional patent application serial No. 60/245,488 filed Nov. 2, 2000.

BACKGROUND OF THE INVENTION

A turbogenerator electric power generation system is generally comprised of a compressor, a combustor including fuel injectors and an ignition source, a turbine, and an electrical generator. Often, the system includes a recuperator to preheat combustion air with waste heat from the turbine exhaust. A recuperator is most efficient if the mass flows through it are evenly distributed. A recuperator also reduces the expansion ratio of the turbine and thus the power extracted by the turbine. Therefore, what is needed is a turbine engine that promotes even mass distribution of the exhaust gas into the recuperator and maximizes the turbine expansion ratio.

SUMMARY OF THE INVENTION

In one aspect, the present invention provides a turbine engine comprising a turbine rotationally driven by hot gas to exhaust the gas, a compressor rotationally coupled to the turbine to generate compressed air, an annular combustor for combusting fuel and the compressed air to generate the hot gas, the combustor extending coaxially away from the turbine to form a passage for the turbine exhaust gas therethrough, an annular recuperator surrounding the turbine for transferring heat from the turbine exhaust gas to the compressed air, a surface spaced from the combustor to direct the exhaust gas exiting from the passage into the recuperator, and an elongated structure extending from the surface into the passage toward the turbine to direct the exhaust gas flowing through the exhaust passage.

In another aspect, the elongated structure is generally conical. In other aspects, the structure is spaced from the combustor to form an annular exhaust passage, wherein the exhaust passage may be configured to sustain diffusion of the exhaust gas flowing therethrough. The passage may also be configured for evenly distributing the exhaust gas entering the recuperator.

DETAILED DESCRIPTION OF THE INVENTION

Figure 1:
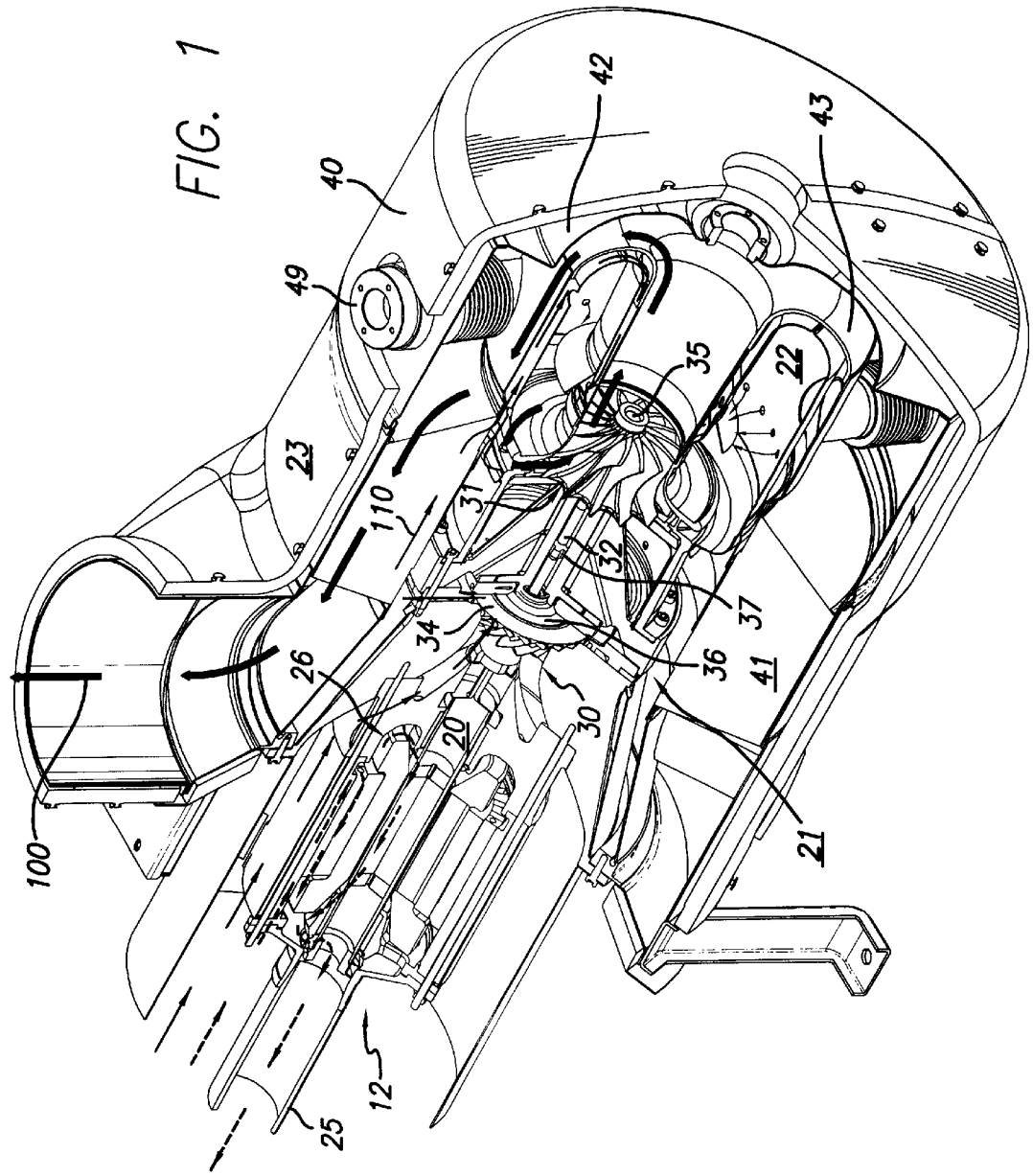
FIG. 1 is perspective view, partially in section, of a turbogenerator system according to the present invention.

Referring to FIG. 1, integrated turbogenerator system 12 generally includes generator 20, power head 21, combustor 22, and recuperator (or heat exchanger) 23. Power head 21 of turbogenerator 12 includes compressor 30, turbine 31, and common shaft 32. Tie rod 33 to magnetic rotor 26 (which may be a permanent magnet) of generator 20 passes through common shaft 32. Compressor 30 includes compressor impeller or wheel 34 that draws air flowing from an annular air flow passage in outer cylindrical sleeve 29 around stator 27 of the generator 20. Turbine 31 includes turbine wheel or impeller 35 that receives hot exhaust flowing from combustor 22. Combustor 22 receives preheated air from recuperator 23 and fuel through a plurality of fuel injectors 49. Compressor wheel 34 and turbine wheel 35 are supported on rotor or common shaft 32 having radially extending air-flow bearing rotor thrust disk 36. Common shaft 32 is rotatably supported by a single air-flow journal bearing within center bearing housing 37 while bearing rotor thrust disk 36 at the compressor end of common shaft 32 is rotatably supported by a bilateral air-flow thrust bearing.

Generator 20 includes magnetic rotor or sleeve 26 rotatably supported within generator stator 27 by a pair of spaced journal bearings. Both rotor 26 and stator 27 may include permanent magnets. Air is drawn by the rotation of rotor 26 and travels between rotor 26 and stator 27 and further through an annular space formed radially outward of the stator to cool generator 20. Inner sleeve 25 serves to separate the air expelled by rotor 26 from the air being drawn in by compressor 30, thereby preventing preheated air from being drawn in by the compressor and adversely affecting the performance of the compressor (due to the lower density of preheated air as opposed to ambient-temperature air).

In operation, air 110 is drawn through sleeve 29 by compressor 30, compressed, and directed to flow into recuperator 23. Recuperator 23 includes annular housing 40 with heat transfer section or core 41, exhaust gas dome 42, and combustor dome 43. Heat from exhaust gas 110 exiting turbine 31 is used to preheat compressed air 100 flowing through recuperator 23 before it enters combustor 22, where the preheated air is mixed with fuel and ignited such as by electrical spark, hot surface ignition, or catalyst. The fuel may also be premixed with all or a portion of the preheated air prior to injection into the combustor. The resulting combustion gas expands in turbine 31 to drive turbine impeller 35 and, through common shaft 32, drive compressor 30 and rotor 26 of generator 20. Expanded turbine exhaust gas 100 then exits turbine 31 and flows through recuperator 23 before being discharged from turbogenerator 12.

Figure 2:
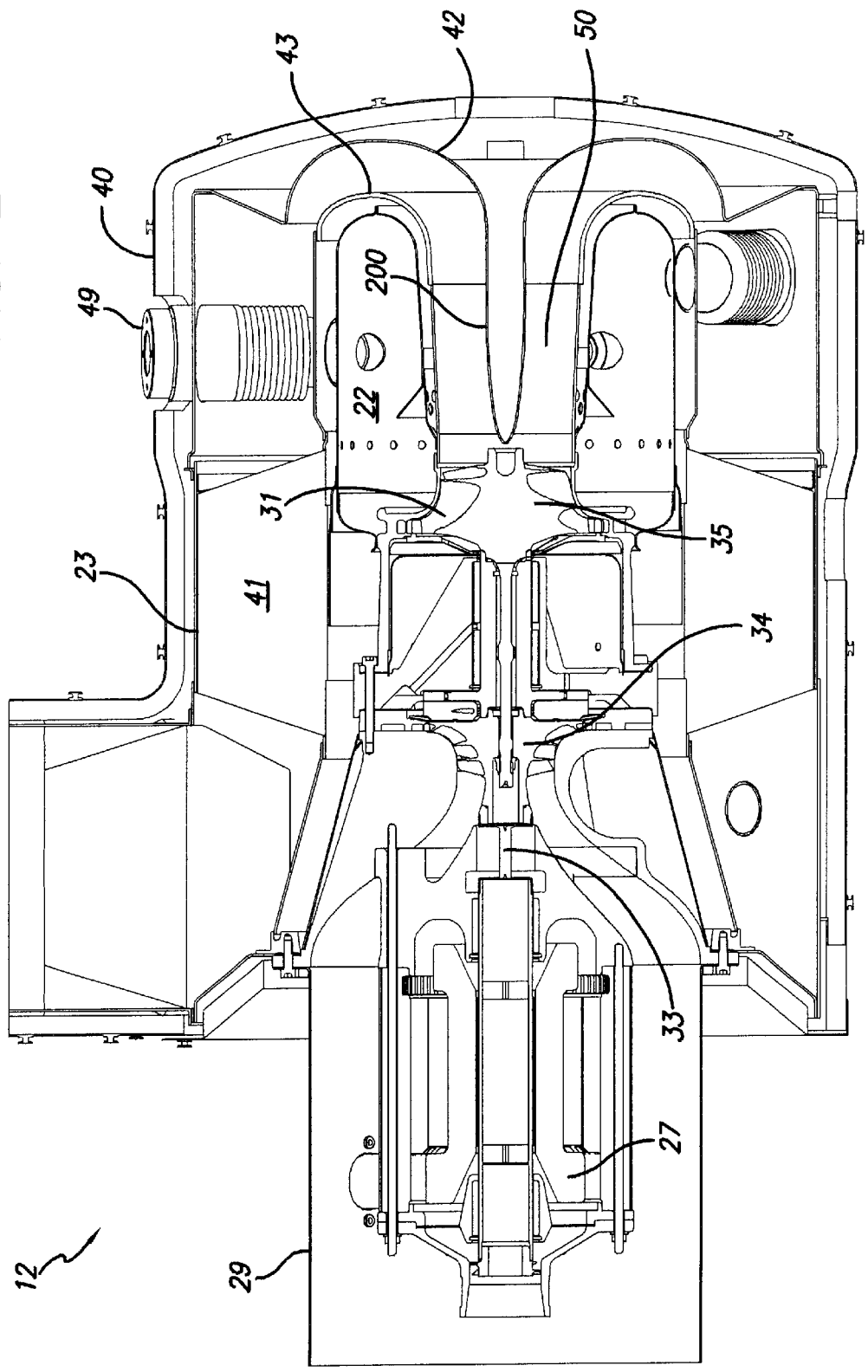
FIG. 2 is a simplified, partial sectional view of the turbogenerator system of FIG. 1 including a vortex disrupter according to the invention.

Referring to FIG. 2, combustor dome 43 is formed in a annular configuration to creating turbine exhaust gas passage 50. Exhaust passage 50 channels expanded turbine exhaust gas and directs it to flow towards exhaust dome 42 disposed at the end of combustor dome 43 distal of turbine 31. Exhaust dome 42 is formed with a generally semispherical configuration that directs exhaust gas to flow radially outward and reverse direction towards recuperator core 41. To maximize the diffusion of exhaust gas and thus maximize the expansion ratio across turbine 31, exhaust passage 50 is formed with a generally conical configuration that allows the exhaust gas to diffuse as it flows towards exhaust dome 42.

Exhaust gas exits turbine 31 at very high speed and with a rotational directional component due to the rotation of the turbine impeller 35. Thus, the flow of exhaust gas resembles a vortex flow in which the primary or main flow travels along the outer annulus of passage 50 and the secondary flow travels in the center of passage 50 and is generally characterized as low energy or low velocity flow. In some cases the secondary flow can be in the reverse direction and travel back toward the turbine impeller. Most of the mass flow discharge from the turbine is contained in the primary flow. The primary flow in effect forms an acoustic cavity around the secondary flow. Due to the highly turbulent and unsteady nature of the flow, this acoustic cavity can be excited to thereby create an acoustic resonance within the secondary flow.

To facilitate the diffusion of the exhaust gas as it flows through passage 50, one embodiment of the present invention provides exhaust vortex disrupter 200 disposed within exhaust passage 50. Disrupter 200 is mounted to exhaust dome 42 and extends from the exhaust dome coaxially towards turbine 31 to terminate proximal to turbine impeller 35. In the preferred embodiment illustrated, disrupter 200 is formed in a generally conical configuration that cooperates with combustor dome 43 to define passage 50 as an annular, generally conical passage for the exhaust gas. Disrupter 200 is configured and spaced from combustor dome 43 to displace the secondary core region of the flow in passage 50 and to promote a more even velocity distribution in the flow as well as sustained diffusion of the exhaust gas. A more even velocity distribution helps to reduce pressure losses created in passage 50. By occupying the central volume of passage 50, disrupter 200 guides the exhaust flow towards exhaust dome 42 with greater diffusion, lower pressure losses, and a consequent greater expansion ratio across the turbine and higher turbine power output.

Furthermore, disrupter 200 continues to direct exhaust gas as it arrives at exhaust dome 42, encouraging the gas to flow radially outward. In conventional systems, the exhaust gas would impinge generally perpendicularly upon exhaust dome 42 before being forced radially outward by the upstream exhaust gas that is being discharged by the turbine impeller. Furthermore, in conventional systems the effective flow area increases rapidly as the gas passage turns radially. The rapid area increase causes flow separation which prevents further diffusion. Additionally, the momentum of the flow tends to pull the flow off the wall of combustor dome 43 as the flow turns radially outward. This flow separation increases the pressure losses in passage 50 and promotes uneven velocity distribution as the exhaust gas flows towards the recuperator inlet. Thus, the base of disrupter 200 at which the disrupter is mounted to the exhaust dome is contoured with a generally conical surface to direct oncoming exhaust gas 100 radially outward and thus allow the exhaust gas to continue diffusing after it exits passage 50. The contours of combustor dome 43 and exhaust dome 42 are designed to guide the flow radially outward through a smoothly varying cross-sectional flow area and thus prevent flow separation and promote continued diffusion through the passage.

Disrupter 200 further acts to more evenly distribute exhaust gas as it exits passage 50 and is reversed by exhaust dome 42 to enter recuperator core 41, thereby enhancing the heat transfer efficiency of the recuperator. Because exhaust dome 42 provides a stable platform onto which to mount disrupter 200, there is no need for struts or similar structures to fasten and secure the disrupter. Avoiding the use of such struts is highly desirable because the struts cause pressure loss and noise. Noise is also reduced by the use of disrupter 200 because it displaces the potential acoustic cavity that may be created by the secondary flow downstream of the turbine and eliminates the noise associated with acoustic resonation of this cavity. An additional advantage of using disrupter 200 is that by enhancing the diffusion of exhaust gas 100, passage 50 may be shortened and thus entire turbogenerator 12 may be constructed with a reduced footprint.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention, as defined and limited solely by the following claims.

What is claimed is:

1. A turbine engine, comprising:
   a turbine rotationally driven by hot gas to exhaust the gas;
   a compressor rotationally coupled to the turbine to generate compressed air;
   an annular combustor for combusting fuel and the compressed air to generate the hot gas, the combustor extending coaxially away from the turbine to form a passage for the turbine exhaust gas therethrough;
   an annular recuperator surrounding the turbine for transferring heat from the turbine exhaust gas to the compressed air;
   a surface spaced from combustor to direct the exhaust gas exiting from the passage into the recuperator; and
   an elongated structure extending from the surface into the passage toward the turbine to direct the exhaust gas flowing through the exhaust passage, wherein the structure extends through the passage to terminate proximal to the turbine.

2. The engine of claim 1, wherein the structure is spaced from the combustor to form an annular passage for the turbine exhaust gas, the passage having a generally increasing cross-sectional area.

3. The engine of claim 2, wherein the structure is generally conical.

4. The engine of claim 1, wherein the structure is spaced from the combustor to form an annular exhaust passage for evenly distributing the exhaust gas directed into the recuperator.

5. The engine of claim 2, wherein the structure is generally conical.

* * * * *